(No Model.)

J. D. LEFÈVRE.
PLOW.

No. 320,481. Patented June 23, 1885.

Witnesses:
J. C. Renwee
Charles R. Searle

Inventor:
Jean D. Lefèvre
by his attorney
Thomas D. Stetson

UNITED STATES PATENT OFFICE.

JEAN DOMINIQUE LEFÈVRE, OF GUISE, FRANCE.

PLOW.

SPECIFICATION forming part of Letters Patent No. 320,481, dated June 23, 1885.

Application filed October 13, 1884. (No model.) Patented in France September 17, 1883, No. 157,981.

*To all whom it may concern:*

Be it known that I, JEAN DOMINIQUE LEFÈVRE, of Guise, in the Department of Aisne, France, have invented certain new and useful Improvements in Plows, of which the following is a specification.

It has long been appreciated as important to be able to change the action of the plow so as to turn the furrow to the right hand or to the left at will. This is especially important in plowing on hillsides, and such plows have been sometimes called "hillside-plows." The capacity for thus changing is useful in various other situations. I have devised means for avoiding a large portion of the labor involved in effecting the change from right-hand to left-hand plowing. I employ the power of the animal or animals to perform the principal labor in effecting the change. The attendant is required, in addition to the proper guiding of the team and plow, to exercise only a slight force through a cord or equivalent to condition the machine to allow the change to be made. It may frequently happen, particularly in rough work, as among rocks or stumps, that the draft of the animals may be in the direction to effect the change when it is not desired. I provide for preventing such change except when the attendant desires.

The following is a description of what I consider the best means of carrying out the invention.

The accompanying drawings form a part of this specification.

Figure 2:
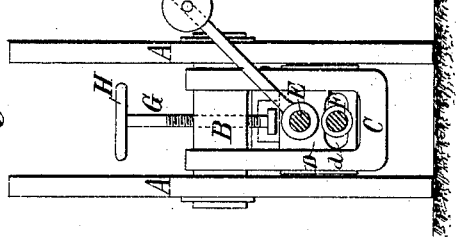
Figure 1:
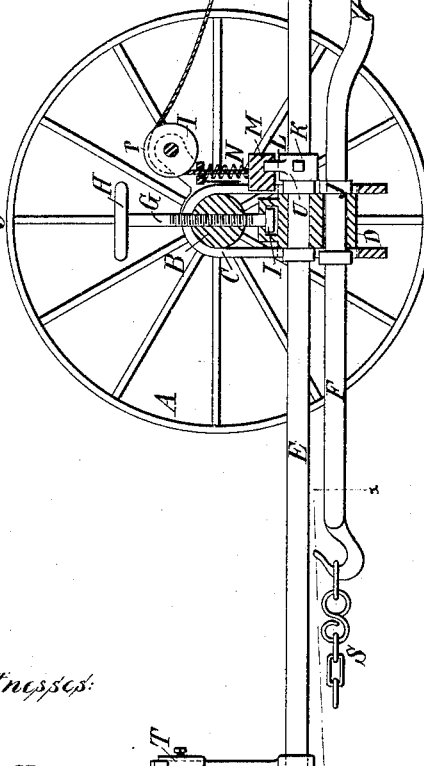
Figure 3:
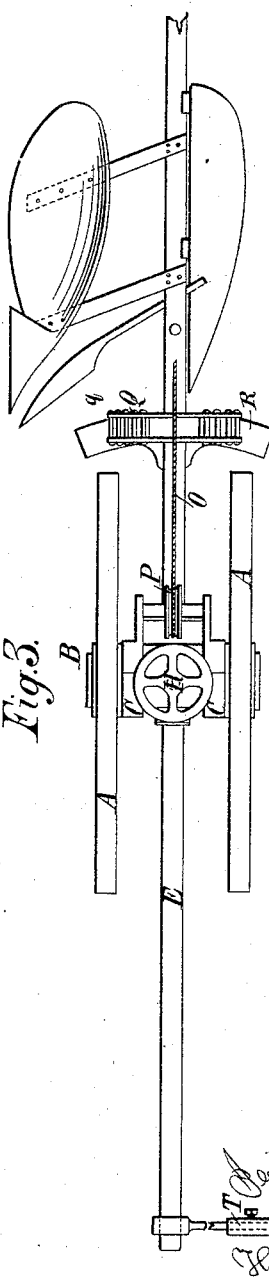

Figure 1 is a side elevation partly in vertical section. Fig. 2 is a section on the line $x$ $x$ in Fig. 1. Fig. 3 is a plan view.

Similar letters of reference indicate corresponding parts in all the figures where they occur.

The plow is supported on two wheels, A, running loosely on an axle, B, to which axle is suspended, by straps C, a central block, D, which is traversed by a horizontal cylindrical beam, E, which is capable of rocking or turning a quarter-revolution alternately in one direction and the other. At a lower level in the block D is a horizontal slot, $d$, in which is mounted loosely a draw-bar, F, provided with a collar, J, through which the draft of the animals is transmitted to the plow. On the back end of this draw-bar is a horizontal segment, R, on the upper side of which are cylindrical projections or pins $r$, serving as teeth, engaging with longitudinal pins $q$ in a gear-wheel or segment of gear, Q, fixed on the beam E. The draw-bar F serves, under certain conditions, as a lever to effect the rocking of the beam E, and consequently the change of condition of the plow.

There are two plowshares, $Z'$ and $Z^2$, one, $Z'$, being adapted to turn the furrow to the right hand, and the other, $Z^2$, being adapted to turn the furrow to the left hand. There are two corresponding colters or turf-cutters, $Y'$ and $Y^2$. These parts are fixed on the beam E, and as the latter is turned one plowshare with its accompanying parts is brought into position for work while the other is lifted out of the ground and carried idly.

On the shaft E is rigidly fixed a collar, U, having two short arms, K L, standing at an angle of ninety degrees each with the other.

M is a dog having a recess on the lower side, adapted to engage with either the arm K or the arm L, according as one or the other is presented in the upright position. This dog is strongly supported laterally, but is capable of sliding, subject to the force of a spring, N, which depresses it constantly, and of a cord, O, which is led over a pulley, P, and on being pulled by the attendant can raise the dog M at intervals.

When the dog M is engaged with an arm, K or L, it holds the beam E and its attachments against any rotation. When, on the contrary, the dog M is lifted the beam E and its plowshares may be turned by any sufficient force.

G is a screw tapped through the axle B and having a hand-wheel, H, by which it may be turned, and a button, I, by which it engages with the block D. Turning this screw G in one direction or the other raises and lowers the block D, and consequently determines the depth at which the plow shall travel.

T is a weight on an arm fixed on the beam E.

The screw G being properly adjusted, the animals are first caused to pull on the chain S—not in the direct forward line proper for plowing, but quite obliquely, or even at right angles. This causes the bar F to move hard over to one end—the left end—of the slot $d$, and then, being firmly held there, to serve as a fulcrum. The segment R acts by its teeth $r$ to forcibly turn the gear-wheel or segment Q, and consequently to turn the attached beam E and plowshares Z' Z² in the desired direction. The dog M being previously lifted by a sufficient force applied by the attendant through the cord O, the beam E and its attachments yield to this force and the plowshares assume the desired position. Thus conditioned the cord O is slackened and the dog M allowed to sink and engage strongly with the arm L. Now the plow is in condition for effective working, turning the furrow to the left, and the team is hauled around into line and pulls the bar F directly forward. The slot $d$ is of sufficient length to allow it to assume a position parallel to the beam E. In this condition the plow works as long as may be required.

When it is desired to reverse the direction in which the furrow is turned, the rear end of the plow is lifted, so as to lift the plowshare from the ground, the animals are turned to the right and caused to pull the forward end of the bar F to the right. This moves it first bodily to the right end of the slot $d$, where it is then held and serves as a fulcrum, while the segment R, with its teeth $r$, act on the toothed wheel or segment Q to rock the beam E in the direction to lift the plowshare Z² and depress into the working position the plowshare Z'. The dog M being previously lifted clear of the arm L, this change is easily effected. The dog M on being again lowered engages with the arm K. Now the entire mechanism is in condition for plowing, as before, except that now the plowshare Z' and its accompanying colter Y' are effective, and the furrow is turned to the right.

The counter-weight T may be of sufficient magnitude to balance the plowshare which is lifted; but a counter-weight of much less gravity will suffice.

A turning of the team at the end of each furrow is necessary in order to bring them into the proper line for making the next furrow. Under ordinary conditions this natural turning of the team can be made available to effect the changing of the plow without requiring any special movement of the team for the purpose. Whenever a corner is turned where it is not desired to shift the plow the attendant omits to pull on the cord O. When, on the contrary, a corner is turned at which it is desirable that the condition of the plow be shifted, the attendant, first taking care to disengage the plow from the earth, pulls on the cord O with sufficient force to lift the dog M and holds the main body of the plow by its handles, (not represented,) so that it can be easily turned. Under these conditions the force of the team applied through the chain S to the front end of the bar F effects the partial rotation of the beam E, and consequently the complete change of position of the plowshares. So soon as this is effected the attendant slackens the cord O and allows the dog M to engage with the arm L or K, at the same time allowing or, perhaps, aiding the entire plow to turn around into the correct position for the next furrow.

Modifications may be made in the forms and proportions without departing from the principle or sacrificing the advantages of the invention. I can dispense with the counter-weight T. I can dispense with the elevating screw G. Other means than the cord O may be employed to raise and lower the dog M. The spring N may be dispensed with, and the gravity of the dog M may be sufficient to bring it down firmly into engagement with the proper arm L, and to hold it there under all ordinary and extraordinary joltings. I prefer the whole as shown.

The dog M is important to prevent the beam E and its attachments from being turned by accidental forces induced by irregular changes in the line of draft of the team.

I claim as my invention—

1. The rocking beam E, carrying two plowshares, Z' Z² and the necessary accompanying parts, in combination with supporting means, as A B, and the draw-bar F, and a mechanical connection, as Q R, whereby a side draft of the animals on the draw-bar effects the turning of beam E, substantially as herein specified.

2. In a plow, the block D, having a longitudinal slot, $d$, in combination with the draw-bar F, having a collar, J, and horizontal sector R, and with the vertical sector Q, and beam E carrying two plowshares arranged for joint operation, substantially as and for the purposes herein specified.

3. The locking-dog M, with means, as N O, for moving it, in combination with the rocking beam E, carrying two plowshares, Z' Z², and with means, as F R Q, for revolving the latter by a lateral draft of the animals, substantially as herein specified.

4. The partial counter-weight T, in combination with the rocking beam E, two plowshares, Z' Z², and provisions, as F R Q, for rotating the beam by the force of the animals, as herein specified.

In testimony whereof I have signed this specification in the presence of two subscribing witnesses.

JEAN DOMINIQUE LEFÈVRE.

Witnesses:
 EDUARD P. MACLEAN,
 E. REMBAULT.